(12) United States Patent
Schach et al.

(10) Patent No.: US 7,972,036 B1
(45) Date of Patent: Jul. 5, 2011

(54) MODULAR BOLLARD LUMINAIRE LOUVER

(75) Inventors: John William Schach, Kyle, TX (US);
Donald Manuel Perreira, San Marcos, TX (US); Chris Boissevain, Wimberley, TX (US)

(73) Assignee: Genlyte Thomas Group LLC DE (US)

( * ) Notice: Subject to any disclaimer, the term of this patent is extended or adjusted under 35 U.S.C. 154(b) by 207 days.

(21) Appl. No.: 12/112,548

(22) Filed: Apr. 30, 2008

(51) Int. Cl.
*F21V 29/00* (2006.01)

(52) U.S. Cl. ........ 362/290; 362/294; 362/373; 362/342; 362/345; 362/249.06

(58) Field of Classification Search .................. 362/294, 362/373, 290, 279, 217.03, 325, 342, 345, 362/291–292, 249.02, 249.06, 249.14
See application file for complete search history.

(56) References Cited

U.S. PATENT DOCUMENTS

| | | | |
|---|---|---|---|
| 0,492,320 A | 2/1893 | Bodkin | |
| 1,484,978 A | 2/1924 | Wheeler | |
| 2,428,630 A | 10/1947 | Lanter | |
| 3,193,001 A | 7/1965 | Meckler | |
| 3,311,743 A | 3/1967 | Moore | |
| 3,372,740 A | 3/1968 | Kastovich, et al | |
| 3,593,014 A * | 7/1971 | Vesely | 362/291 |
| 3,596,136 A | 7/1971 | Trenton | |
| 3,801,815 A | 4/1974 | Docimo | |
| 3,845,292 A | 10/1974 | Koziol | |
| 3,890,126 A | 6/1975 | Joseph | |
| 4,081,023 A | 3/1978 | Edelstein et al. | |
| 4,225,808 A | 9/1980 | Saraceni | |
| 4,321,656 A | 3/1982 | Gruver, Jr. | |
| 4,433,328 A | 2/1984 | Saphir et al. | |
| 4,503,360 A | 3/1985 | Bedel | |
| 4,509,106 A | 4/1985 | Meyer et al. | |
| 4,729,076 A | 3/1988 | Masami et al. | |
| 4,734,835 A | 3/1988 | Vines et al. | |
| 4,860,177 A | 8/1989 | Simms | |
| 4,871,944 A | 10/1989 | Skwirut et al. | |
| 4,941,072 A | 7/1990 | Yasumoto | |
| 4,954,822 A | 9/1990 | Borenstein | |
| 4,982,176 A | 1/1991 | Schwarz | |
| 4,982,376 A | 1/1991 | Megens et al. | |
| 4,999,749 A | 3/1991 | Dormand | |
| 5,010,452 A | 4/1991 | Krebser et al. | |
| 5,075,833 A | 12/1991 | Dormand | |
| 5,136,287 A | 8/1992 | Borenstein | |
| 5,138,541 A | 8/1992 | Kano | |
| 5,351,172 A | 9/1994 | Attree et al. | |
| 5,537,301 A | 7/1996 | Martich | |
| 5,548,499 A | 8/1996 | Zadeh | |
| 5,557,170 A | 9/1996 | Ooms | |
| 5,585,697 A | 12/1996 | Cote et al. | |
| 5,636,057 A | 6/1997 | Dick | |
| 5,688,042 A | 11/1997 | Madadi et al. | |
| 5,785,418 A | 7/1998 | Hochstein | |
| 5,790,040 A | 8/1998 | Kreier et al. | |

(Continued)

FOREIGN PATENT DOCUMENTS

DE 4311804 10/1994

(Continued)

*Primary Examiner* — Thomas M Sember

(57) ABSTRACT

A modular louver assembly for a bollard luminaire comprises a louver having an upper surface, a lower surface and an opening, a heat sink disposed within the opening of the louver and adjacent the lower surface, a plurality of LEDs disposed about the heat sink on a lower surface of the louver, and, a lens disposed beneath the heat sink.

11 Claims, 11 Drawing Sheets

U.S. PATENT DOCUMENTS

| | | |
|---|---|---|
| 5,867,099 A | 2/1999 | Keeter |
| 5,924,788 A | 7/1999 | Parkyn |
| 5,980,071 A | 11/1999 | Hsieh |
| 5,993,027 A | 11/1999 | Yamamoto et al. |
| 6,045,240 A | 4/2000 | Hochstein |
| 6,050,707 A | 4/2000 | Kondo et al. |
| 6,068,384 A | 5/2000 | Tyson et al. |
| 6,154,362 A | 11/2000 | Takahashi et al. |
| 6,166,640 A | 12/2000 | Nishihira et al. |
| 6,183,114 B1 | 2/2001 | Cook et al. |
| 6,193,603 B1 | 2/2001 | Tai |
| 6,234,649 B1 | 5/2001 | Katougi |
| 6,276,814 B1 | 8/2001 | Gough |
| 6,341,877 B1 | 1/2002 | Chong |
| 6,350,043 B1 | 2/2002 | Gloisten |
| 6,350,046 B1 | 2/2002 | Lau |
| 6,367,949 B1 | 4/2002 | Pederson |
| 6,379,024 B1 | 4/2002 | Kogure et al. |
| 6,392,541 B1 | 5/2002 | Bucher et al. |
| 6,402,346 B1 | 6/2002 | Liao et al. |
| 6,502,962 B1 | 1/2003 | Menke et al. |
| 6,548,967 B1 | 4/2003 | Dowling et al. |
| 6,560,038 B1 | 5/2003 | Parkyn et al. |
| 6,573,536 B1 | 6/2003 | Dry |
| 6,632,006 B1 | 10/2003 | Rippel et al. |
| 6,678,168 B2 | 1/2004 | Kenny, Jr. et al. |
| 6,705,751 B1 | 3/2004 | Liu |
| 6,815,724 B2 | 11/2004 | Dry |
| 6,860,628 B2 | 3/2005 | Robertson et al. |
| 6,871,983 B2 | 3/2005 | Jacob et al. |
| 6,897,624 B2 | 5/2005 | Lys et al. |
| 6,905,227 B2 | 6/2005 | Wu |
| 6,927,541 B2 | 8/2005 | Lee |
| 6,943,687 B2 | 9/2005 | Lee et al. |
| 6,955,440 B2 | 10/2005 | Niskamen |
| 6,965,715 B2 | 11/2005 | Lei et al. |
| 6,974,233 B1 | 12/2005 | Aubrey |
| 6,986,593 B2 | 1/2006 | Rhoads |
| 6,994,452 B2 | 2/2006 | Rozenberg et al. |
| 6,997,583 B2 | 2/2006 | Broelemann |
| 7,014,341 B2 | 3/2006 | King et al. |
| 7,021,787 B1 | 4/2006 | Kuelbs |
| 7,098,486 B2 | 8/2006 | Chen |
| 7,104,672 B2 | 9/2006 | Zhang |
| 7,140,753 B2 | 11/2006 | Wang et al. |
| 7,144,140 B2 * | 12/2006 | Sun et al. ............... 362/373 |
| 7,178,952 B2 | 2/2007 | Bucher et al. |
| 7,182,547 B1 | 2/2007 | Leonhardt et al. |
| 7,186,002 B2 | 3/2007 | Matthews et al. |
| 7,207,690 B2 | 4/2007 | Haugaard et al. |
| 7,221,271 B2 | 5/2007 | Reime |
| 7,307,546 B1 | 12/2007 | Partap |
| 7,322,718 B2 | 1/2008 | Setomoto et al. |
| 7,325,998 B2 | 2/2008 | Leonhardt et al. |
| 7,329,031 B2 | 2/2008 | Liaw et al. |
| 7,348,723 B2 | 3/2008 | Yamaguchi et al. |
| 7,387,405 B2 | 6/2008 | Ducharme et al. |
| 7,440,280 B2 | 10/2008 | Shuy |
| 7,524,089 B2 * | 4/2009 | Park ............... 362/294 |
| 7,582,911 B2 | 9/2009 | Lynch et al. |
| 7,604,380 B2 | 10/2009 | Burton et al. |
| 2002/0122309 A1 | 9/2002 | Abdelhafez et al. |
| 2002/0145878 A1 | 10/2002 | Venegas |
| 2002/0152045 A1 | 10/2002 | Dowling et al. |
| 2003/0222587 A1 | 12/2003 | Dowling et al. |
| 2004/0022058 A1 | 2/2004 | Birrell |
| 2004/0120152 A1 | 6/2004 | Bolta et al. |
| 2004/0141326 A1 | 7/2004 | Dry |
| 2005/0030761 A1 | 2/2005 | Burgess |
| 2005/0036322 A1 | 2/2005 | Veffer |
| 2005/0122229 A1 | 6/2005 | Stevenson et al. |
| 2005/0168986 A1 | 8/2005 | Wegner |
| 2005/0190567 A1 | 9/2005 | Childers et al. |
| 2005/0207168 A1 | 9/2005 | Chabert |
| 2005/0276053 A1 | 12/2005 | Nortrup et al. |
| 2006/0092638 A1 | 5/2006 | Harwood |
| 2006/0109661 A1 | 5/2006 | Coushaine et al. |
| 2006/0126338 A1 * | 6/2006 | Mighetto ............... 362/294 |
| 2006/0164843 A1 | 7/2006 | Adachi et al. |
| 2006/0193139 A1 | 8/2006 | Sun et al. |
| 2006/0209545 A1 | 9/2006 | Yu |
| 2006/0215408 A1 | 9/2006 | Lee |
| 2006/0262545 A1 | 11/2006 | Piepgras et al. |
| 2007/0008726 A1 | 1/2007 | Brown |
| 2007/0030686 A1 | 2/2007 | Haugaard et al. |
| 2007/0076416 A1 | 4/2007 | Leonhardt et al. |
| 2007/0159827 A1 * | 7/2007 | Huang ............... 362/294 |
| 2007/0171647 A1 | 7/2007 | Artwohl |
| 2007/0211470 A1 | 9/2007 | Huang |
| 2007/0230172 A1 | 10/2007 | Wang |
| 2007/0230183 A1 | 10/2007 | Shuy |
| 2007/0230184 A1 | 10/2007 | Shuy |
| 2007/0247853 A1 | 10/2007 | Dorogi |
| 2007/0279909 A1 | 12/2007 | Li |
| 2008/0007955 A1 | 1/2008 | Li |
| 2008/0043472 A1 | 2/2008 | Wang |
| 2008/0080188 A1 | 4/2008 | Wqang |
| 2008/0084701 A1 | 4/2008 | Van De Ven et al. |
| 2008/0158887 A1 | 7/2008 | Zhu et al. |
| 2008/0165535 A1 | 7/2008 | Mazzochette |
| 2008/0204888 A1 | 8/2008 | Kan et al. |
| 2008/0205062 A1 | 8/2008 | Dahm et al. |
| 2008/0212333 A1 | 9/2008 | Chen |
| 2008/0304269 A1 | 12/2008 | Pickard et al. |
| 2009/0052175 A1 * | 2/2009 | Xu et al. ............... 362/249 |
| 2009/0080189 A1 | 3/2009 | Wegner |
| 2009/0086476 A1 | 4/2009 | Wegner |
| 2009/0086481 A1 | 4/2009 | Wegner |
| 2010/0026479 A1 | 2/2010 | Tran |

FOREIGN PATENT DOCUMENTS

| | | |
|---|---|---|
| DE | 19623481 | 12/1997 |
| EP | 0785701 | 7/1997 |
| EP | 0813353 | 12/1997 |
| JP | 11154766 | 8/1999 |
| JP | 2006172895 | 6/2006 |
| JP | 2008171584 | 7/2008 |
| WO | 9946962 | 9/1999 |

* cited by examiner

MODULAR BOLLARD LUMINAIRE LOUVER

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC

None.

BACKGROUND

1. Field of the Invention

The present invention relates generally to a bollard luminaire. More particularly, the invention relates to a bollard luminaire having a plurality of louver modules.

2. Description of the Related Art

Bollards are protective structures which are generally located around buildings or machines at industrial, commercial, or institutional premises. They are believed to be named because their shape tends to resemble posts or "bollards" used at wharfs, and around which mooring lines are fastened. Bollards are generally known as having cement or extruded metal posts to protect an exterior portion of a building or the like. When metal bollard posts are utilized, they may be fastened to structures already placed in the ground or cemented into place, or alternatively filled with cement.

In many instances, the bollard structures are utilized to provide lighting over a preselected area. In some instances, the bollard luminaires provide illumination in a selected direction in order to illuminate a structure which the bollard protects. The bollards are generally known to have domes or other upper casting portions, and multi-tier louvers, or a combination of both.

One problem with existing bollard luminaires is their inefficient use of energy. Existing luminaires are typically on at a high level of illumination for several hours at a time. However, during many of these hours, people are not present, and therefore the high level of illumination is not necessarily needed, where a lower level of illumination would suffice. When examining whether sensors could be utilized with existing bollard designs to sense occupants in the area of the bollard and change the illumination level from a low level to a high level. One problem was the use of sensors which require an unobstructed "view" of the area surrounding the bollard. In order to provide such "view," the sensor had to be placed outside of the bollard, which was detrimental to the aesthetic quality of the bollard. Moreover, a lens needed to be placed over the sensor to try to inhibit vandals who may have attempted to break or steal the sensor. Thus, a bollard design is needed which does not require the sensor to be placed outside of the bollard, and which therefore retains the aesthetically pleasing qualities of the bollard, without inhibiting the utility of the sensor.

Another problem with the existing bollard design is that existing lamp systems are not as efficient as newer forms of lighting, such as light emitting diodes (LEDs) which can emit an equivalent amount of light with less power usage. Additionally, it would be preferable to incorporate the LED technology in such a way as to render the lighting modular so that banks of light could be replaced as they deplete or become less efficient. Alternatively, it would be preferable to easily replace the banks of light as newer lighting technology becomes available without need of replacing the entire bollard assembly.

Given the foregoing, it will be appreciated that a luminaire is needed which has improved efficiency over existing luminaires, which allows for easy replacement of the lamp structures and which also utilizes a sensor which is enclosed within the luminaire housing.

SUMMARY OF THE INVENTION

A modular louver assembly for a bollard luminaire comprises a louver having an upper surface, a lower surface and an opening, a heat sink disposed within the opening of the louver and adjacent the lower surface, a plurality of LEDs disposed about the heat sink on a lower surface of the louver, and, a lens disposed beneath the heat sink. The heat sink having an downwardly directed surface, each of the plurality of LEDs directed downwardly generally from said downwardly directed surface. Each of the LEDs are positioned on the heat sink. Alternatively, each of the LEDs is positioned on a printed circuit board. The printed circuit boards having a plurality of thermal vias. The heat sinks having a plurality of fins extending radially. The plurality of LEDs directing light downwardly below a peripheral edge of the louver. The modular louver assembly wherein the plurality of LEDs are spaced from about 0 degrees to about 180 around the heat sink. The plurality of LEDs are spaced from about 0 degrees to about 360 degrees around the heat sink.

A modular louver assembly comprises a lens having a diffuse surface, a louver disposed above the lens, the louver having a frusto-saucer shape, a heat sink positioned between the lens and the louver, the heat sink having an LED mounting surface directed toward the lens and beneath a lower peripheral edge of the louver. The modular louver assembly wherein multiple modules define a bollard assembly. The modular louver assembly wherein the LEDs are directed outwardly generally perpendicularly from the mounting surface. The modular louver assembly wherein the LEDs positioned on a printed circuit board, the printed circuit board having a plurality of thermal vias for thermal transmission from the LEDs to the heat sink. The modular louver assembly further comprising a double sided adhesive thermal conductive tape. The modular louver assembly wherein the heat sink is formed of aluminum.

A modular louver assembly comprises a heat sink having a plurality of fins, a radially outward surface on the heat sink angled from a radially outward upper edge to a radially inward lower edge, a plurality of LEDs disposed on the radially outward surface, a louver disposed above the heat sink, at least a portion of the fins disposed within an opening of the louver, a lens disposed beneath the heat sink and the louver.

A luminaire assembly comprises a housing, a plurality of light emitting diodes disposed within the housing, a microwave sensor disposed within the housing for detecting occupants in an area adjacent the housing, wherein the microwave sensor is in electrical communication with the light emitting diodes, and wherein the light emitting diodes are driven at a first light level and in response to the microwave sensor at a second light level.

The luminaire assembly further comprising an LED driver module. The luminaire assembly wherein the luminaire is a sconce. The luminaire assembly wherein the luminaire is a bollard-type luminaire. The luminaire assembly wherein the housing is an upper dome housing. The luminaire assembly further comprising a plurality of louver light modules. The luminaire assembly wherein light emitting diodes positioned within the each of the plurality of louver light modules. The luminaire assembly wherein a LED driver module receives a signal from the microwave sensor. The luminaire assembly wherein the microwave sensor detects movement 360 degrees about the luminaire. The luminaire assembly wherein the microwave sensor having a range of up to about twenty-five (25) feet in radius. The luminaire assembly wherein the luminaire assembly provides increased LED longevity. The luminaire assembly wherein the luminaire assembly providing reduced temperature in one of the first level and the second level. The luminaire assembly wherein the luminaire assembly provides reduced energy consumption in one of the first level and the second level.

A luminaire with demand response illumination comprises a luminaire housing having a substantially hollow interior area, an LED driver module including a microwave sensor positioned within the housing, a plurality of LEDs in the housing, the plurality of LEDs in electronic communication with the LED driver module and microwave sensor, wherein the louver light module drives the LEDs at one of a first lower level or a second higher level based on the occupancy detection of the microwave sensor. The luminaire wherein said luminaire is a bollard luminaire. The luminaire wherein the luminaire housing is a substantially dome casting with a substantially hollow interior area. The luminaire further comprising at least one louver light module spaced from the luminaire. The luminaire further wherein the at least one LED driver module may ramp the LEDs down from the second higher level to the lower first level over a preselected time. The luminaire wherein the preselected time may be up to 15 minutes. The luminaire wherein the microwave sensor emits a signal from within the housing. The luminaire wherein the microwave sensor emits a signal from between a dome casting and at least one louver light module. The luminaire wherein the microwave sensor is substantially enclosed in the housing. The luminaire wherein the luminaire is a sconce.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION

Figure 1:
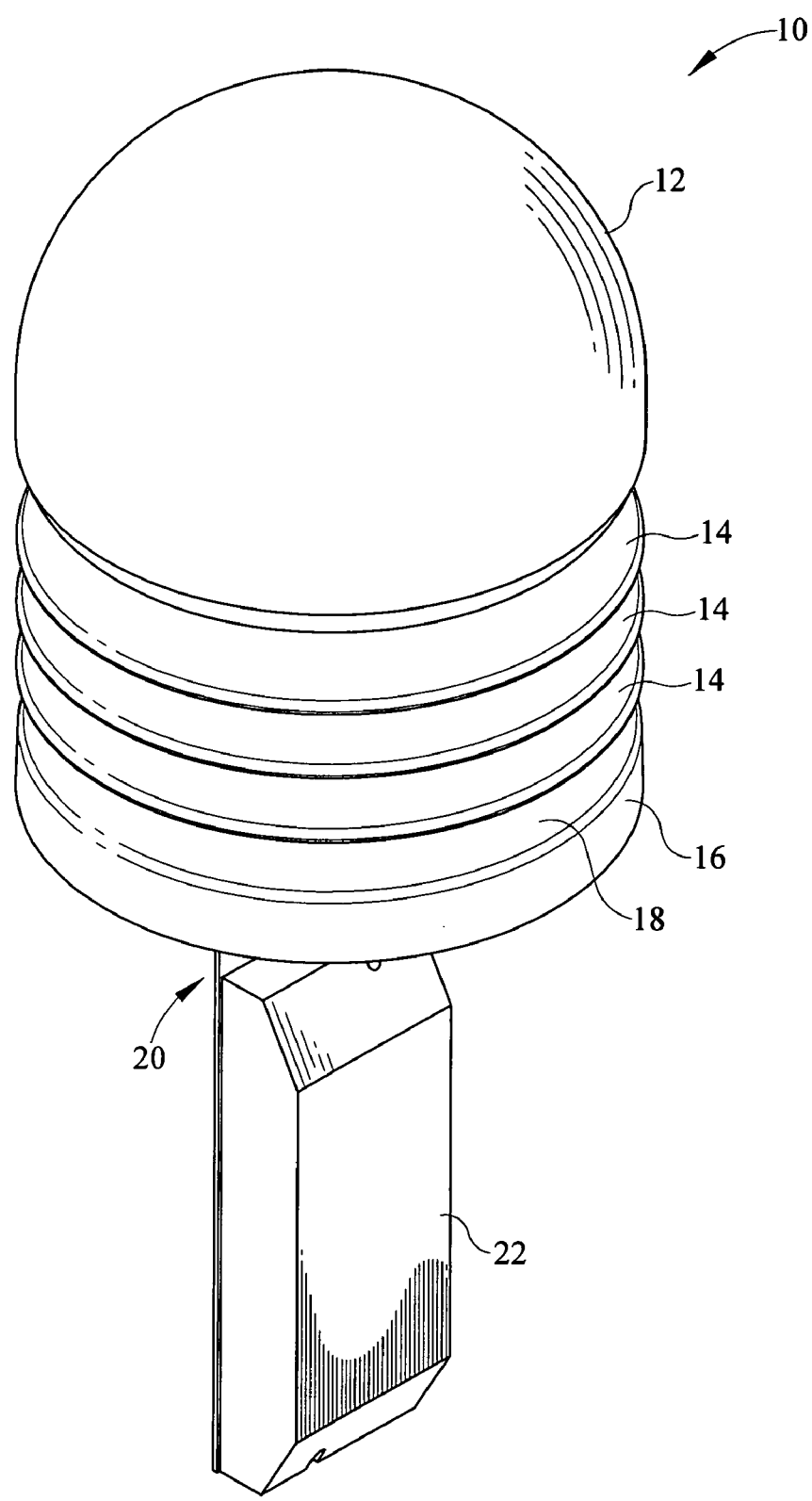
FIG. 1 depicts a perspective view of a bollard luminaire head assembly.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Additionally, it should be understood that various components taught herein my be utilized with bollards and other luminaires, so the claims provided herein should not be considered as limited to bollard luminaires unless such is explicitly claimed.

Referring now in detail to the drawings, wherein like numerals indicate like elements throughout the several views, there are shown in FIGS. 1-11 various aspects of a luminaire. Specifically, the bollard luminaire shown in FIGS. 1-9 utilizes louver light module assembly having a louver, a heat sink, a plurality of LEDs mounted to the heat sink and a lens. The modular assembly allows for easy replacement of the louver module. The luminaire which may be a bollard or alternative luminaire also utilizes a driver module with microwave sensor which signals a driver to drive the LEDs at a first lower level when no occupants are detected, providing great energy savings. Upon detection by the microwave sensor of an occupant, the driver module drives the LEDs at a second higher level for a preselected time until the LED levels are decreased after a preselected period of time of no occupant detection.

Referring initially to FIG. 1, a bollard head assembly 10 is shown in perspective view. The bollard head assembly 10 includes an upper dome casting or housing 12, which is semispherical in shape. Alternatively, other shapes may be utilized, such as a bevel top, a square bollard or cylindrical shaped upper bollard. The upper dome casting is formed of die cast aluminum, and may be finished in multiple colors including bronze, black, white, beige or other exemplary colors, although any such shape or color should not be considered limiting. Alternatively, other materials may be utilized such as glass, acrylic, polymeric materials to define lenses in the upper housing area 12. The upper dome casting 12 is hollow internally to at least receive a driver and sensor assembly, described further herein.

Beneath the upper dome casting 12 are pluralities of louver light module assemblies 14. The exemplary device includes three louver light module assemblies 14, however various numbers of assemblies may be utilized to vary the total light output of the bollard head assembly 10. The louver assemblies 14 are generally frusto-saucer shaped with a central aperture (not shown) through which fins may pass to provide thermal conductivity and to offer internal support to the bollard head assembly 10.

Beneath the louver light module assemblies 14 is an external lower support casting 16. The lower support casting 16 is also a die cast aluminum structure, which is generally circular in cross-section with a central opening and a frusto-saucer like upper portion 18. Depending from the upper dome casting 12 and beneath the lower support casting 16 is a power supply mounting bracket. The bracket 20 is defined by a flat piece of metal to which a power supply 22 is connected. The power supply converts 120-277 volt AC power to 48 volt DC output and is a component which is known to one of ordinary skill in the art.

The bollard head assembly 10 utilizes a light emitting diode system with demand response. The LED bollard 10 is normally illuminated, for example at night, at a first lighting level. When a person or object is moved within a preselected proximity of a microwave sensor, the LED lighting ramps upwardly to a second light output, to more brightly illuminate the proximity where the person or object is detected. Thus, while illuminating the area at the first lighting level, the demand response LED bollard head assembly 10 is able to save considerable energy, until maximum lighting is required at the second output level, and upon detection of a person or object within a preselected proximity. For example, the first lighting level may be 10% of maximum output while the second lighting level may be 100% of maximum output. However, these are merely exemplary values. The bollard assembly may provide a pattern of lighting of either 360 degrees or 180 degrees based on the number of LEDs utilized. Also, the light level may vary based on the quantity of louvers utilized to define the LED bollard head assembly 10.

Figure 2:
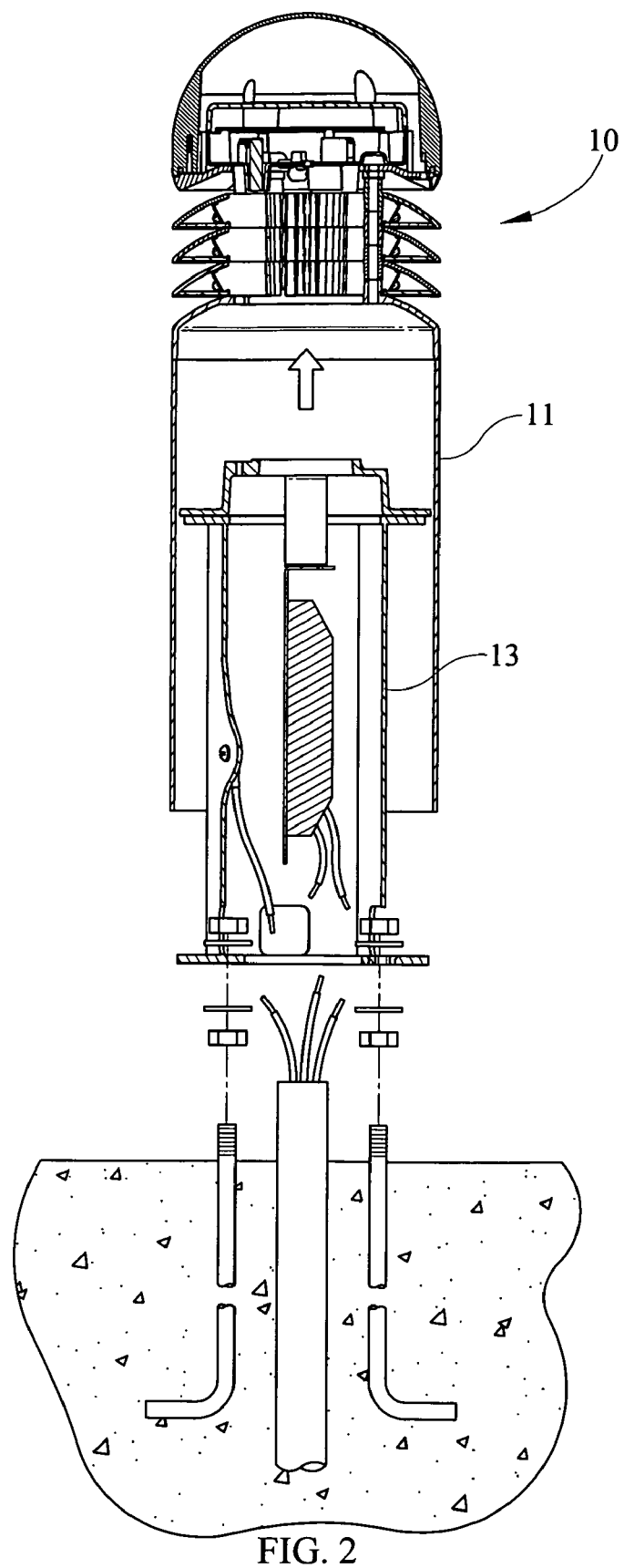
FIG. 2 depicts an exploded elevation of a full bollard luminaire assembly.

Referring now to FIG. 2, a sectional view of a bollard is depicted. The LED bollard head assembly 10 may be mounted to a base 11 to define a bollard luminaire. The base 11 may be formed of concrete or an extruded aluminum matching the finish of the upper portions of the bollard assembly 10. The bollard 10 comprises an internal tenon 13 within the base 11 which connects to mounting bolts with the substrate where the LED bollard head assembly 10 is positioned. The bollard head assembly 10 may be manufactured for use with existing bollards as a replacement head or for new installations. The term bollard and bollard head assembly are interchangeably used as the head assembly 10 may be used with a base 11 to form a bollard.

Figure 3:
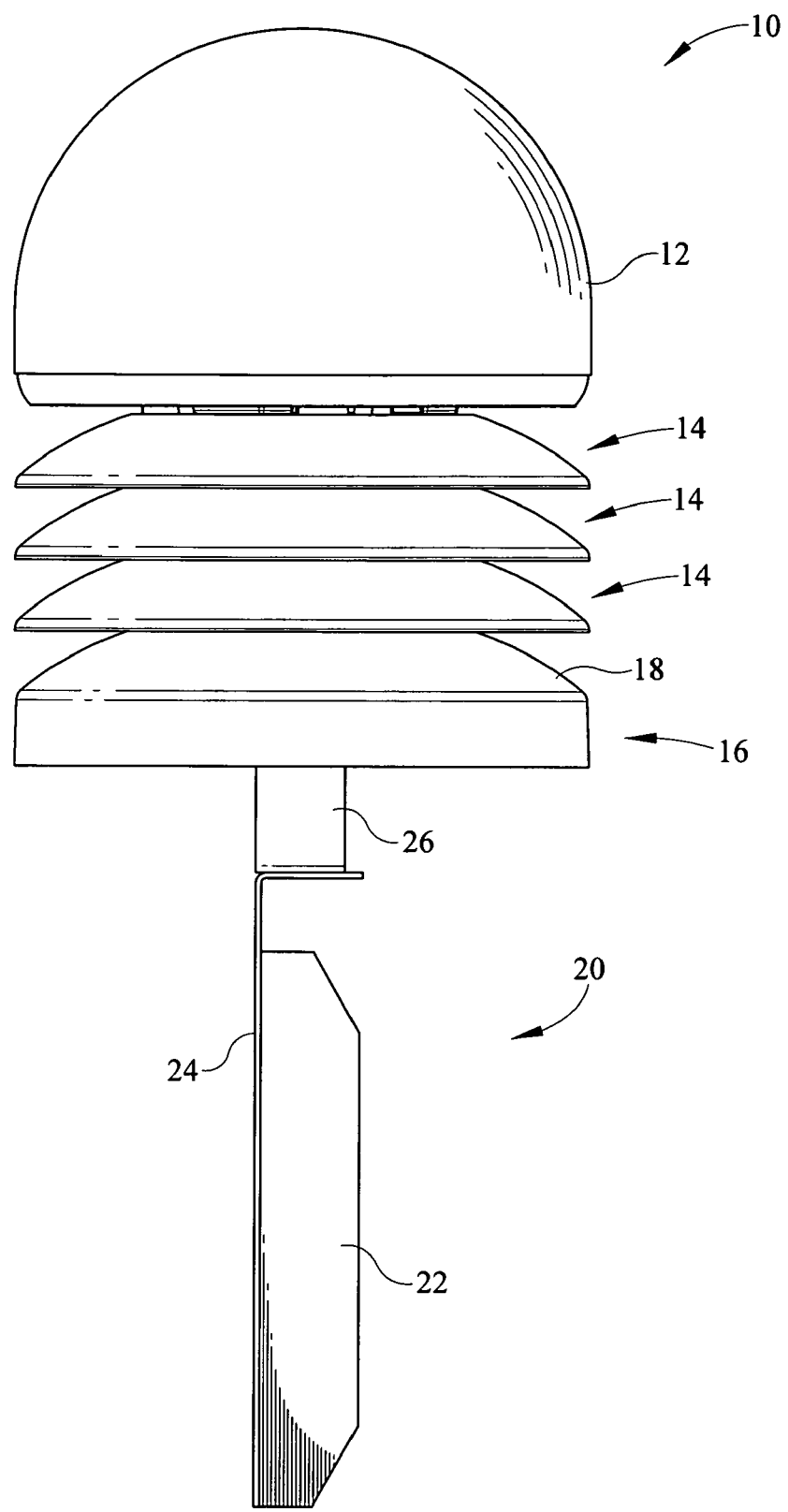
FIG. 3 depicts a side elevation view of the bollard assembly of FIG. 1.
Figure 4:
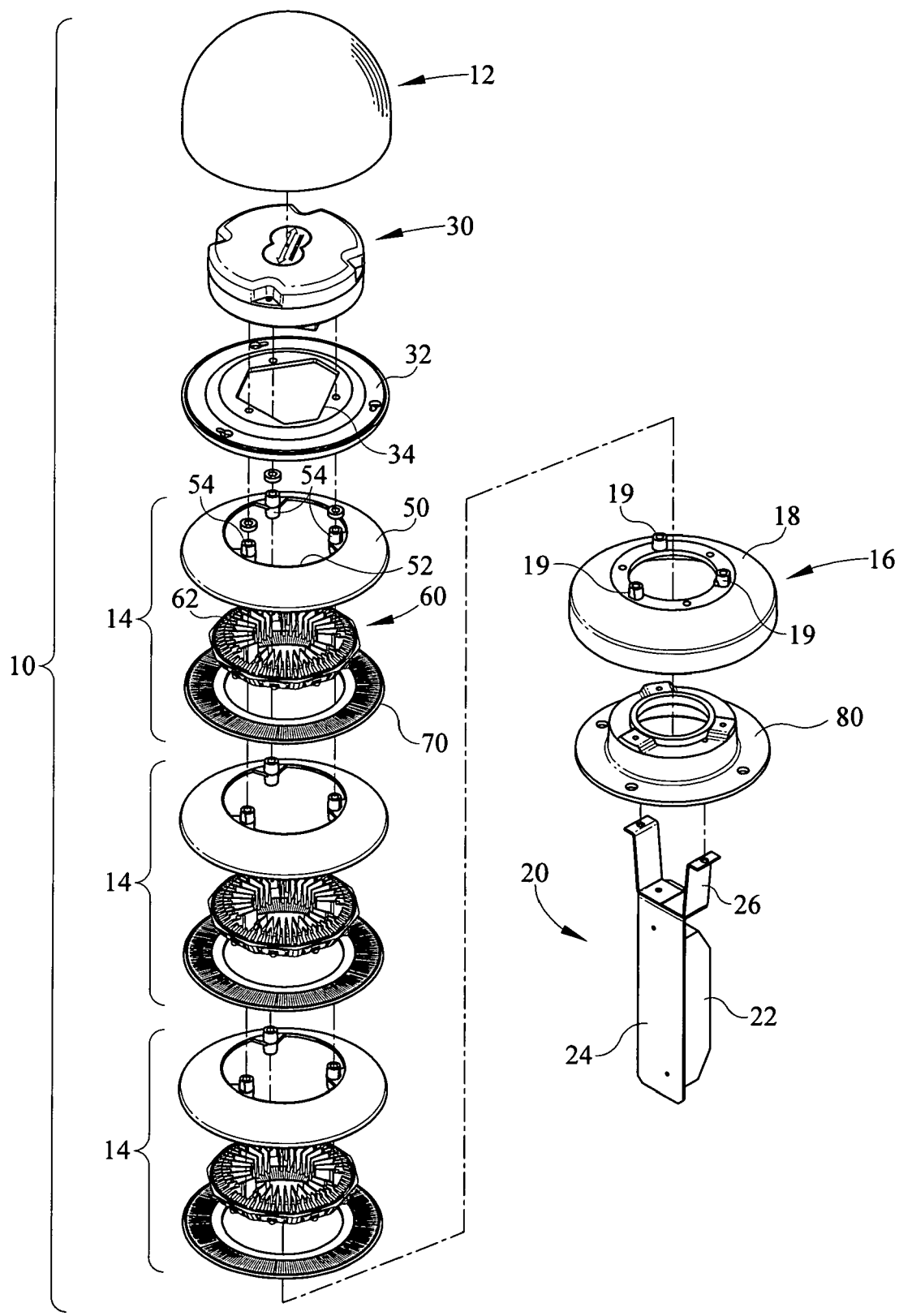
FIG. 4 depicts an exploded perspective view of a bollard head assembly.

Referring now to FIG. 3, the LED bollard head assembly 10 is depicted in a side elevation view removed from the base 11 (FIG. 2). The dome casting 12, plurality of louver light module assemblies 14, and lower external support casting 16 are each depicted. The elements are all mounted to the mounting bracket 20, which is defined by a lower power supply bracket 24, and an upper bracket 26 connected to the external lower support casting 16. The lower power supply bracket 24 is substantially L-shaped providing a surface for connection to upper bracket 26. As shown in FIG. 4, the upper brackets 26 are each Z-shaped and connected to an upper surface of bracket 26. Although these descriptions are provided, they are merely exemplary.

Referring now to FIG. 4, the LED bollard head assembly 10 is depicted in exploded perspective view. Beneath the upper dome casting 12 is a driver and microwave sensor housing module 30. Beneath the module 30 is an internal support casting 32 which has a central hexagonally shaped aperture 34, although alternate aperture shapes may be used which accommodates the microwave sensor 90 (FIG. 6) passage through casting 32. Spaced about the periphery of the aperture 34 are a plurality of bolt apertures, which receive fasteners aligned with the module 30, so that the module 30 is seated and fastened to the internal support casting 32. The module 30 is positioned within the hollow upper casting 12. Beneath the casting 32 are the louver light module assemblies 14. In the depicted embodiment there are three assemblies 14 beneath the upper housing 12, module 30, and internal support casting 32. Each of the louver assemblies 14 includes a saucer shaped louver 50 with a central aperture 52 positioned therein. Extending from the peripheral edge of the aperture 52 are three fastener castings 54, which are aligned with at least one aperture in the internal support casting 32 to be fastened to the internal support casting 32. The louver 50 is formed of die cast aluminum and may be finished in various colors such as black, bronze, copper, beige, white or silver. Beneath the louver 50 is a heat sink 60, which is formed of a thermally conductive material such as aluminum or other such material which will draw heat from the plurality of LEDs positioned there on. The heat sink 60 has a plurality of fins 62 extending radially inwardly from near the perimeter of the structure. The fins 62 define a central opening in the heat sink through which heat may be dissipated upwardly by convection through the spaces between the louver assemblies 14. The outer peripheral edge of the heat sink 60 generally includes an upper edge of a plurality of surfaces extending about the heat sink 60. The surfaces are angled at about 30 degrees from the vertical, or about 60 degrees from the horizontal. Thus, the heat sink 60 comprises an upwardly and outwardly radial edge and a lower radially inwardly edge between which a plurality of mounting surfaces 64 are positioned. Each surface 64 comprises a printed circuit board 66 and a LED 68. The LEDs 68 extend outwardly and generally perpendicular from the mounting surface 64 to direct light downwardly through a lens 70, which defines a lower portion of the louver module assembly 14. Beneath the first louver module 14 are second and third louver module assemblies, which are identical to the previously described module 14, and therefore will not be described additionally.

Beneath the louver light module assemblies 14, is the lower external support casting 16. The upper portion 18 of the lower external support casting 16 is curved to generally match the curvature of the louvers 50 and generally match the uniform appearance between the louver light module assemblies 14. The upper portion 18 also includes fastener castings 19, which allow connection between the louver light module assemblies 14 and the lower support casting 16 as a lower internal support casting 80. The lower internal support casting 80 fits with the lower external support casting 16. Beneath the lower internal support casting 80 is the power supply mounting bracket 20, which connects to the lower internal support casting 80.

Figure 5:
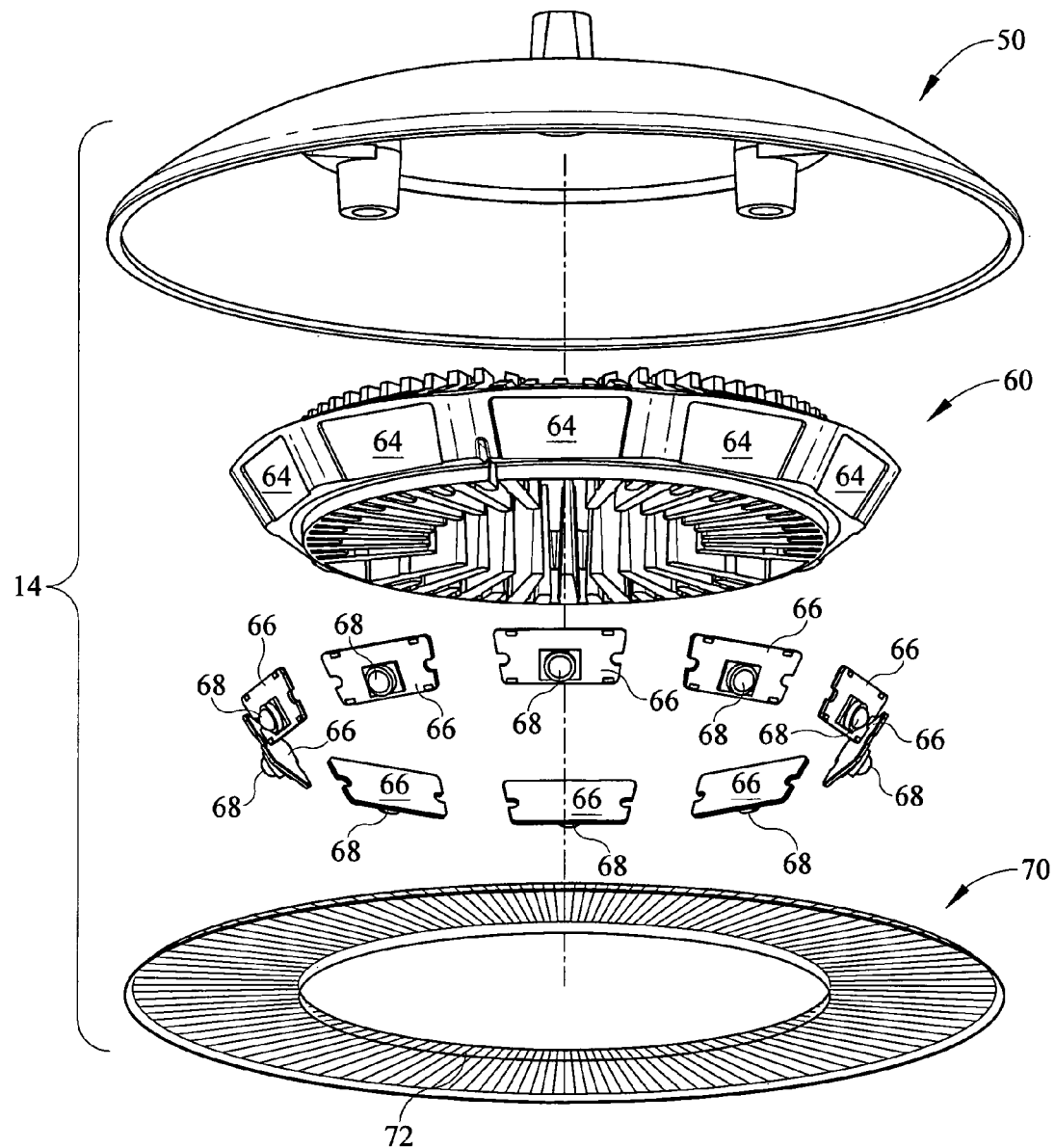
FIG. 5 depicts an exploded perspective view of a louver light module assembly.

Referring now to FIG. 5, an exploded perspective view of a single louver light module 14 is depicted. The exemplary louver 50 is saucer like in shape. The circular cross-section is a useful geometry for the instant bollard head 10, which may illuminate or emit light at both 360 degrees and 180 degrees. The curvature of the saucer through a vertical plane provides a gap between a first louver light module 14 and a second louver light module, which allow for emission of light from between the modules 14. Additionally, the curved surface may also act as a reflector to direct downwardly emitted light in a generally radially outward path from between the louver modules 14. Finally, an air gap between the dome casting 12 the uppermost louver 50 provides for dissipation of heat from the luminaire.

The heat sink 60 includes a plurality of fins 62, which extend radially from the outer edges of the heat sink toward a central location. However, an aperture is defined centrally within the heat sink 60 which allows convective energy to move the heat upward and outward from the louver light modules 14. The aperture 52 of each louver 50 may receive upper edges of the fins 62 to increase efficiency of heat transfer to ambient air from the LEDs 68. A plurality of LED mounting surfaces 64 are located about the heat sink 60. The surfaces 64 are mounted from an outward and upward edge to a downward lower edge of the heat sink 60. Each mounting surface 64 receives an LED circuit board 66, including at least one LED 68 thereon. The heat sink 60 may include a single continuous surface or a plurality of surfaces, as depicted, to mount the circuit boards 66. Each printed circuit board 66 may be an FR4 board type and may be mounted to the heat sinks 60 using double adhesive thermal conductive transfer tape. Alternatively, a metal core printed circuit board may be utilized or the circuit may be printed on the heat sink 60 directly. Further, the adhesive may be substituted with thermal grease or thermal epoxy in order to adhere a circuit board to the heat sink 60. Additionally, the LEDs 68 may be connected in parallel fashion so that if a single LED is damaged or burns out, the remaining LEDs will continue to operate until the module 14 is changed. Alternatively, the exemplary embodiment utilizes LEDs connected serially with a zener diode to allow operation of the various LEDs even when a single LED fails. Beneath the heat sink 60 is the lens 70 which is annular in shape and has a central aperture 72. The aperture 72 may receive a lower lip defined by the lower portions of the fins 62 of heat sink 60. The lens 70 may be connected to the heat sink 60 either frictionally, or by an adhesive, or alternatively by some other mechanical device. The lens 70 is sized to fit within the lower peripheral rim defined by the louver 50. Thus, once the louver light module 14 is assembled, the heat sink 60 and LEDs 68 are sandwiched between the lens 70 and louver 50, so that all of the heat escapes through the upper aperture 52 of louver 50 or through the louver 50. Once the heat escapes from the modules, it may moves to ambient are between the upper louver 50 and the upper dome 12.

The heat sink 60 will be populated with five or ten high power LEDs, depending on the degree of illumination desired. In the exemplary embodiment, ten LEDs are utilized to provide 360 degrees of illumination. Alternatively however, five LEDs may be utilized along the heat sink 60 for illumination of about 180 degrees, if desired. Alternative configurations are within the scope of the present invention. The boards 66, as previously mentioned, may be wired in parallel to prevent all LEDs from turning off in the event of a single LED failure. A harness may be utilized with a two conductor, twisted/shielded cable wherein the harness is soldered to pads on the LED printed circuit board 66. A quick connector may be used to connect the LED and the driver module 30.

Figure 6:
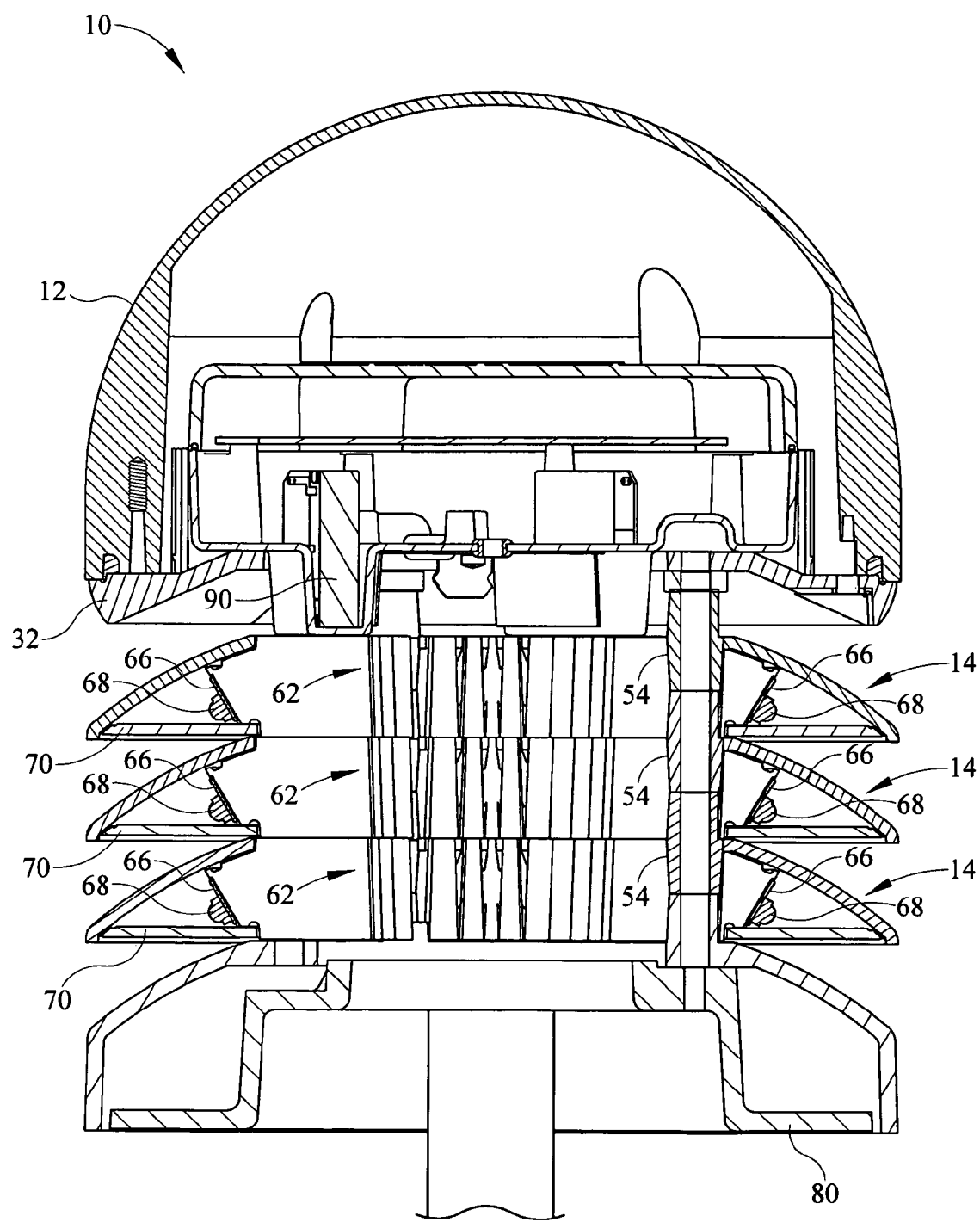
FIG. 6 depicts a sectional view of a portion of the bollard head assembly.

Referring now to FIG. 6, a side-section view of a bollard assembly 10 is depicted. The section view depicts the alignment of the plurality of castings 54 for connection of the upper internal support castings 54. The section view also depicts the printed circuit boards 66 and more specifically the angle of the boards 66 to the lens 70. In the exemplary embodiment, the boards 66 are disposed at about 60 degrees to the horizontal. The LEDs 68 extend from the printed circuit boards 66 so that the light emitted is directed generally downwardly through each lens 70. The lens 70 is generally circular and one-piece for each module 14, however multiple piece lenses may also be utilized. Also shown are the fins 62 which extend upwardly through the center of the head 10. Finally, the lower internal support casting 80 is depicted within the lower support casting 16.

Figure 7:
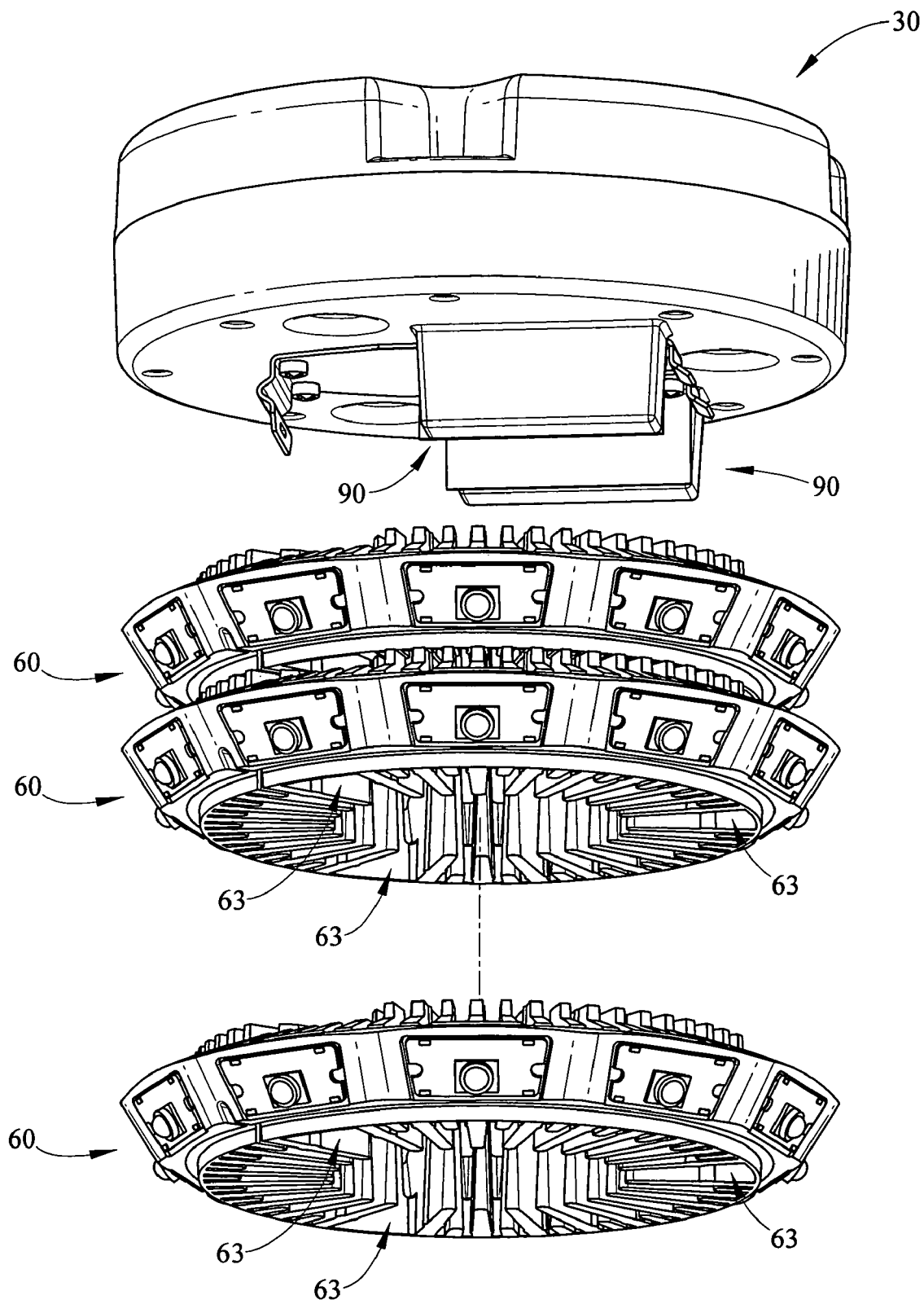
FIG. 7 depicts a perspective view of the heat sinks and driver module with louvers removed.

Referring now to FIG. 7, a perspective view of the LED driver module 30 with adjacent heat sinks 60 are shown. The heat sinks 60 are depicted and spaced from the LED driver module 30 and the louvers 50 and lenses 70 are removed for clarity. The heat fins 62 are spaced about the heat sink 60 and extend inwardly defining a central gap through which convection currents pass. At three locations amongst the fins 62 are casting gaps 63 which allow for positioning of the castings 54. The fastener castings 54 depend downwardly into the heat sinks 60 and extend upwardly into the heat sinks 60 from an adjacent louver 50 below. This provides the alignment and connectability between adjacent modules 14 modular replacement of the louver light modules 14 by allowing a defective module 14 to be removed and replaced. Although three casting gaps 63 are shown and described, the value should not be considered limiting as various numbers may be utilized to provide a rigid connection between the components defining louvers light modules 14.

Figure 8:
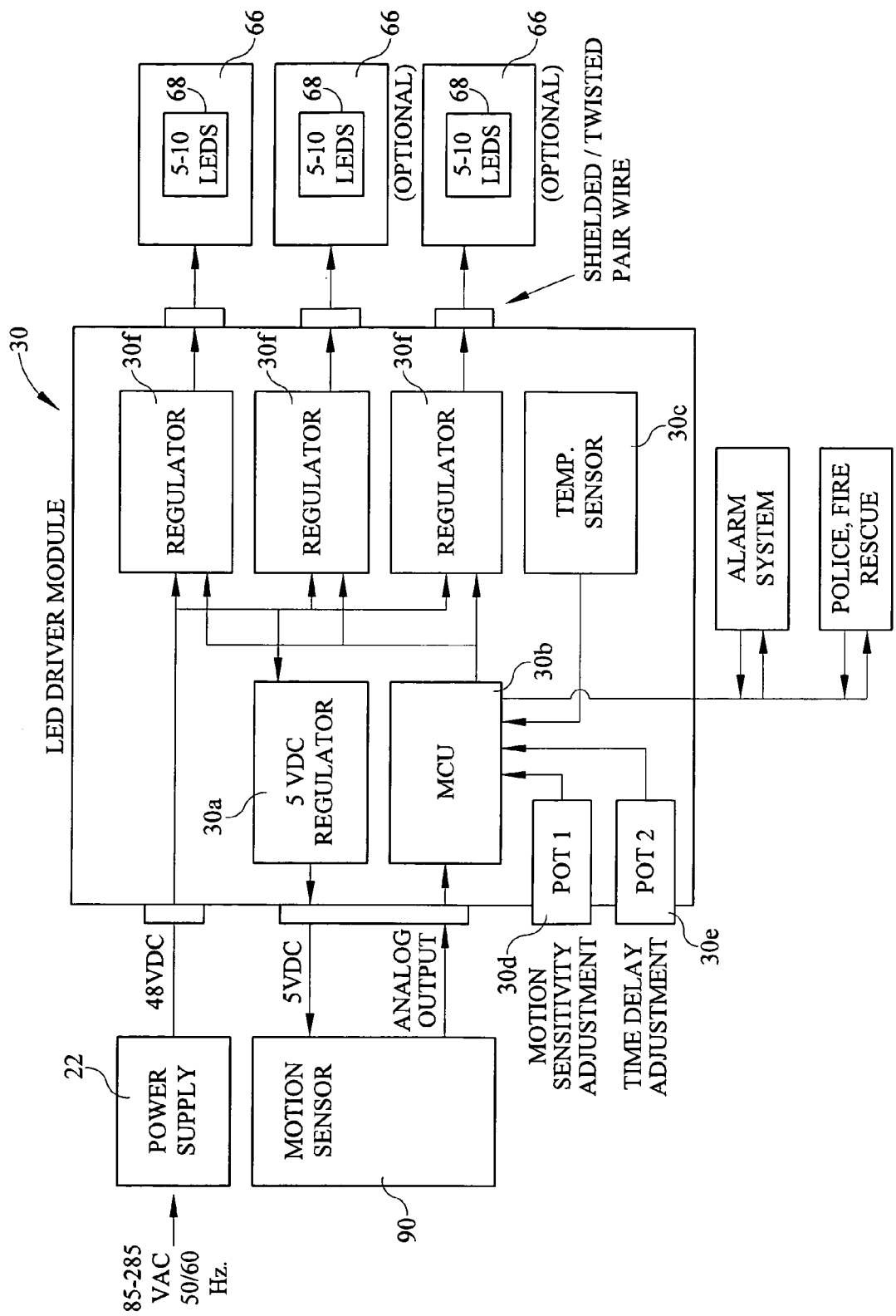
FIG. 8 depicts a block diagram representing the LED driver module for driving the LEDs.

Referring now to FIG. 8, a block diagram of the LED Driver Module 30 is depicted. The LED driver module 30 is powered by the power supply 22. The power input is 48 volt DC, as previously indicated from the power supply 22. Depending from the module 30 are motion sensors 90. The motion sensors 90 utilize microwave technology to sense persons or objects within a preselected perimeter area adjacent the bollard 10 (FIG. 2). The motion sensor 90 is powered by a regulator 30a and provides an output signal to a module computer unit 30b. The module computer unit 30b receives input from a temperature sensor 30c which takes internal temperature readings of the driver module 30. The module computing unit 30b also receives input from a motion sensitivity adjustment 30d and a time delay adjustment 30e. The motion sensitivity 30d adjusts the distance from or the amount of motion that will cause the sensor 90 to signal the module computing unit 30b. The time delay adjustment 30e provides for adjustment of time that the LEDs 68 will remain illuminated after being illuminated at the second, higher level of illumination. Alternatively, the delay 30e may be used to set the amount of time taken to ramp down from the second illumination level to the first illumination level.

The module 30 further comprises three regulators 30f which drive the LEDs 68 mounted on the boards 66. The regulators 30f each drive one module 14 and provides a constant current of between about 350 ma to 1500 ma. The regulators 30f may be wired in parallel so that if one regulator 30f fails, the remaining regulators 30f will continue to operate. Alternatively, a zener diode may be used as previously described.

In operation, the bollard assembly 10 receives an AC input, which is converted to DC output by the power supply 22 for powering the LED driver module 30. The module 30 drives the at least one louver light module 14 which may contain some preselected number of high power LEDs 68. The LED driver module 30 provides 5 volt power to operate the microwave motion sensor 90. The microwave motion sensor 90 signals the LED driver module 30 when a person or object is within a preselected vicinity of the bollard assembly 10. The normal light intensity is kept at about 10% by the LED driver module 30 until motion is sensed, at which time the intensity is ramped up to 100% over a preselected time period, such as five seconds. After a time out period, where no motion is detected within the preselected vicinity, the LEDs will be ramped back down to 10% over some second preselected time, which may be up to about fifteen minutes. Alternatively, the intensity may be varied to other percentages. For example, the normal light intensity may be changed to 50% as a higher normal output is desired. Likewise, the high level intensity may be adjusted downwardly to a suitable level depending on characteristics desired by the customer.

The bollard assembly 10 is designed for a preselected spacing according to known standards. For example, the bollards 10 may be spaced apart based on operating radius of luminance of about 20 feet. According to one exemplary embodiment, the light output has the same luminance as a 50 watt metal halide lamp. At the low level, the bollard assembly may consume about 8 Watts and at the high level, the assembly 10 may consume about 41 Watts. Thus, the device not only saves considerable energy versus a light which is continuously on at a high level.

In designing the bi-level illumination luminaire 10, one goal was to improve efficiency with a light which utilizes less electricity. In meeting this goal, LED manufacturers provide specific operating temperature extremes which should not be exceeded. In the high level lighting mode, these goals were met. However, in the low level lighting mode, the temperature drops relative to the manufacturer guidelines where enough to have an unexpected benefit of greatly increasing the life of the LEDs. Further, this leads to a longer life for the modules 14.

Referring again to FIGS. 6 and 7, the microwave motion sensor module 90 is integrated into the LED driver module 30 housing. The microwave sensor 90 is housed within the dome casting 12 which provides two advantages over prior art sensors used with bollards. First, the sensor 90 is hidden within the casting 12 so that it is not susceptible to vandalism. Also, since a microwave sensor 90 is utilized, a lens is not required on the bollard. A common occupancy sensor is a Passive Infrared (PIR) sensor which requires a lens for zonal division of the infrared region. Further, most PIR modules are large and detract from the aesthetics of the bollard. Finally, PIR sensors look for heat which might lead to false triggers due to the heat expelled from the bollard luminaires. However, the microwave sensor 90 does not require a lens because it emits short waves of energy in the X-band region. Therefore, an unexpected result was that the X-band microwave sensor module 90 may be hidden between within the dome casting 12 and between or between the louver modules 14 so the sensor 90 cannot be seen from the outside of the bollard assembly 10. Additionally, the microwave sensor 90 had the unexpected benefit of being vandal resistant. As shown in FIG. 8, the microwave sensor 90 sends a signal to the module computer unit 30b, in order to ramp up or ramp down the LEDs 68.

According to additional embodiments shown in FIG. 8 of the present bollard assembly 10, the LED driver module 30 may also be utilized in alternative ways to provide additional utility for the bollard 10. For example, according to one embodiment, the driver module 30 may receive an additional input signal from an alarm system with a building adjacent the bollard 10. When an alarm is tripped, a signal could be sent to the bollard LED drive module 30 causing strobe flashing of the LEDs. As police, fire, rescue or other authorities respond to the alarm signal, the flashing strobe pattern would direct the authorities to the correct building from which the alarm signal is sent.

Alternatively, the LED driver module 30 may also signal the alarm system of a building when the microwave sensor 90 detects an occupant. In such instance, the alarm system, upon receiving a signal from the bollard, may notify authorities of an intruder. The signal from the LED driver module 30 may also trigger a camera, a guard station or the like, prior to or concurrently with notification of authorities. The alarm system of FIG. 8 may represent the camera, guard station or the like.

Figure 9:
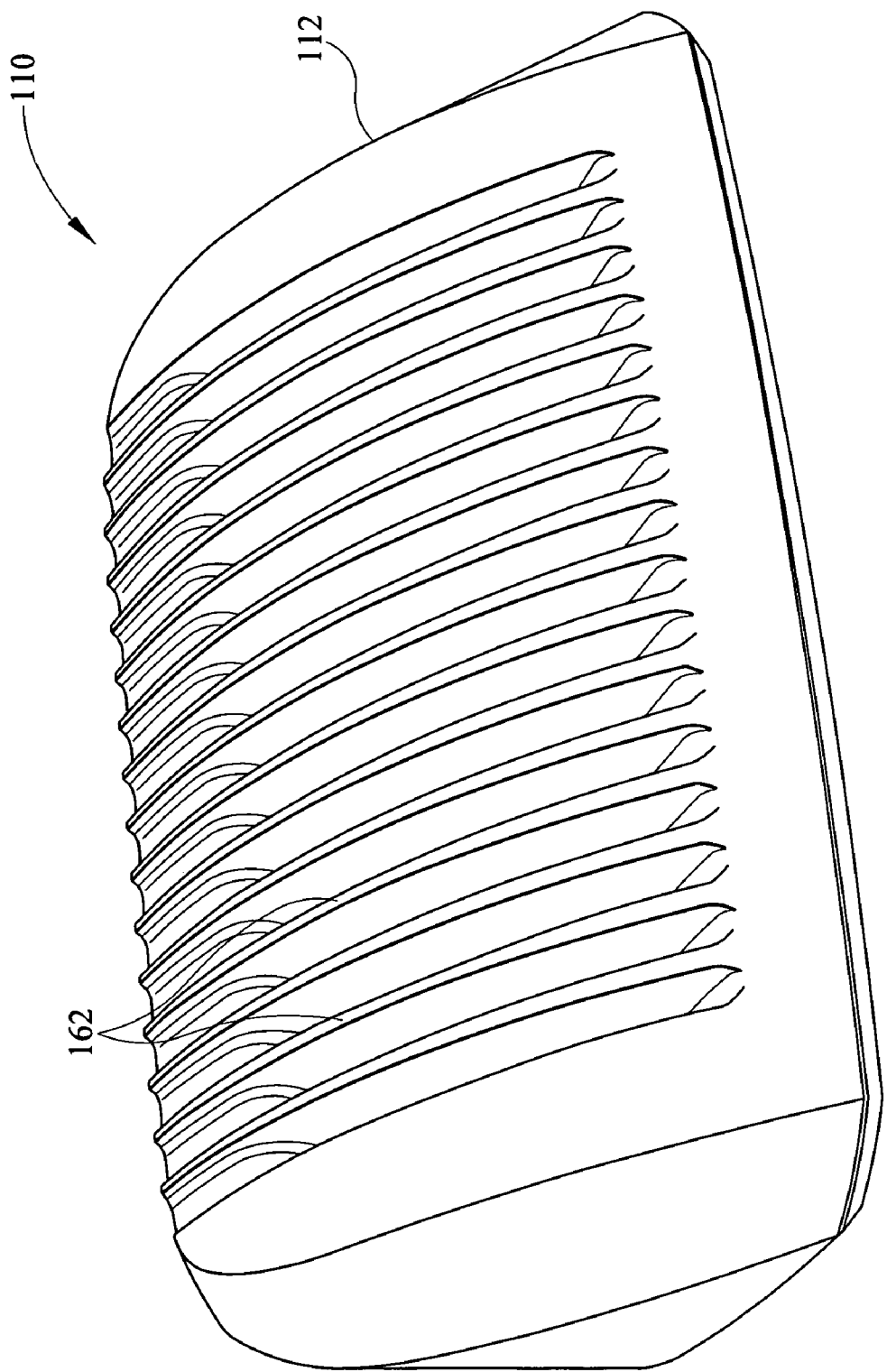
FIG. 9 depicts a perspective view of a sconce embodiment.

Referring now to FIG. 9, a perspective view of a sconce luminaire 110 is depicted in perspective view. The sconce has an outer housing 112, including a plurality of heat sink fins 162 extending from upper edge or a lower front edge. The heat sinks remove heat from the plurality of LEDs utilized by the sconce 110.

Figure 10:
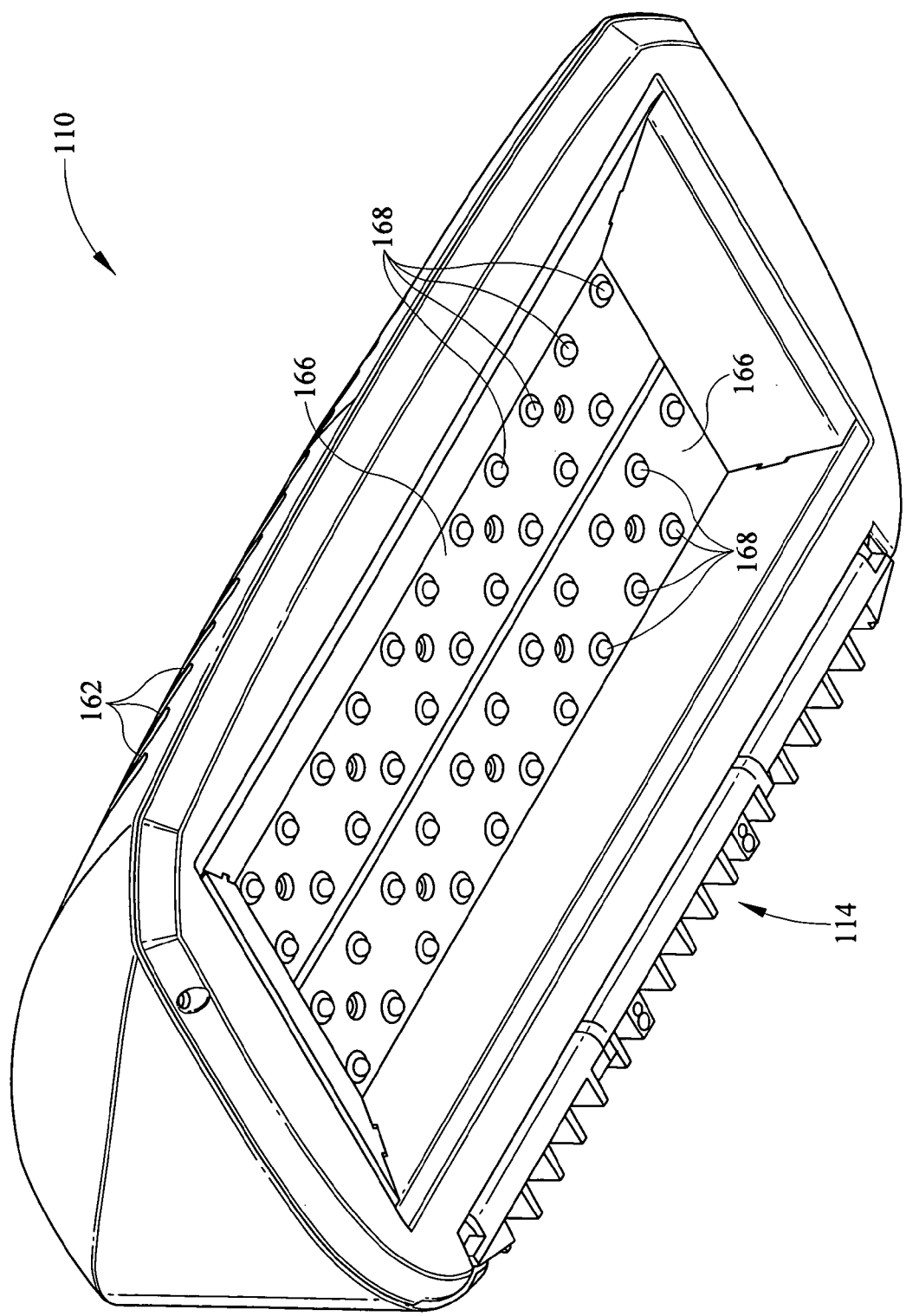
FIG. 10 depicts a lower perspective view of the sconce embodiment of FIG. 9; and, FIG. 11 depicts a side sectional view of the sconce embodiment of FIG. 9.

Referring now to FIG. 10, a lower perspective view of the sconce luminaire 110 is depicted. A mounting casting 114 defines a rear portion of the housing 112 extending across a recessed area of the sconce 110 are first and second light bars 166. The light bars are printed circuit boards to which a plurality of light emitted diodes (LEDs) 168 are mounted. The LEDs alternatively may be mounted on a single light bar or some number greater than two, as depicted.

Figure 11:
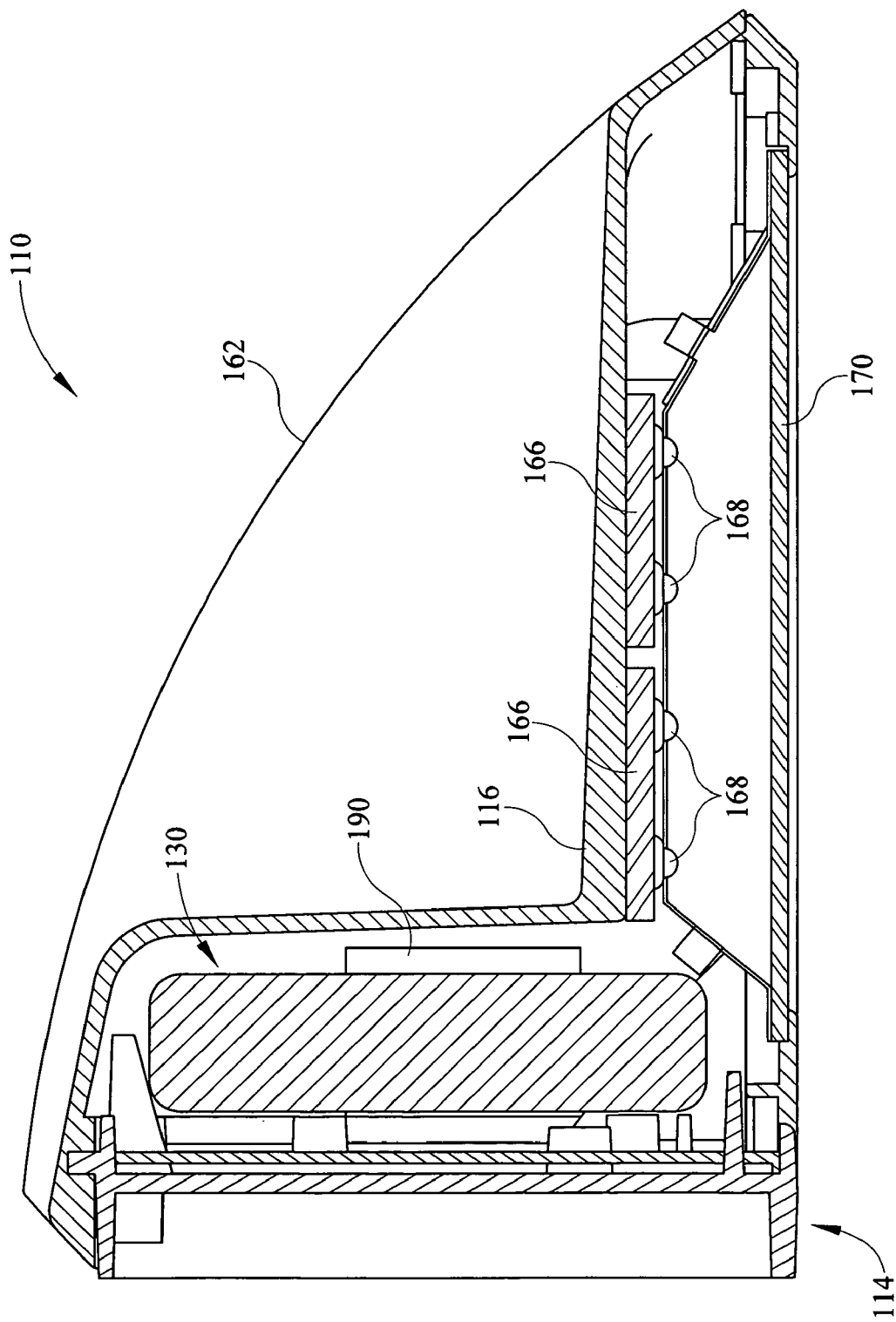

Referring now to FIG. 11, a side-section view of the sconce 110 is depicted. The section view shows a housing casting 116 to which the first and second light bars 166 are connected. The housing casting also comprise the heat sink fins 162, and therefore provided means for heat transfer from the LEDs 168 through the sconce 110 to the atmosphere.

Disposed within the sconce is an LED driver module 130 with the integrated microwave sensor 190. The LED driver module 130 may also include an integrated power supply with the microwave sensor 190, all of which are generally connected to the rear mounting casting 114 or to a plate adjacent thereto.

Beneath the LEDs 168 and light bars 166, a lens 170 is depicted sectionally which allows light to pass through. The lens 170 may clear or may be prismatic to diffuse the light illumination from the LEDs 168 and may be formed of glass or acrylic or other plastics to be understood by one skilled in the art.

The foregoing description of several methods and an embodiment of the invention has been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. A modular louver assembly for a bollard luminaire, comprising:
   a louver having an upper surface, a lower surface and an opening;
   an annular heat sink disposed aligned with said opening of said louver and adjacent said lower surface and having a central opening, said heat sink having a plurality of fins facing inwardly towards said central opening and forming at least one alignment gap;
   a plurality of LEDs disposed on heat sink on a lower surface of said louver and in thermal connectivity with said heat sink fins;
   a lens disposed beneath said heat sink and in optical alignment with said LED's;
   wherein said louver has at least one mating fastener casting extending downward through said alignment gap of said plurality of heat sink fins, said fastener casting providing alignment and connectability of said heat sink and said LED's within said modular louver assembly.

2. The modular louver assembly of claim 1, wherein a plurality of said heat sinks, louvers and lenses are stacked together and interconnected by a plurality of said fastener castings.

3. The modular louver assembly of claim 2, said plurality of heat sinks having a plurality of fins extending radially inwardly forming a thermal convection chimney.

4. The modular louver assembly of claim 1, each LEDs positioned on said heat sink with a PCB, said plurality of PCB's in electrical communication with an LED driver mounted within said bollard luminaire.

5. The modular louver assembly of claim 4, said printed circuit boards having a plurality of thermal vias.

6. The modular louver assembly of claim 1, each of said LEDs angled downwardly away from said louver.

7. A modular louver assembly, comprising:
   a lens having a diffuse surface;
   a louver disposed above said lens, said louver having a central opening;
   a heat sink positioned between said lens and said louver having an open central aperture and a plurality of cooling fins extending into said central aperture;
   said heat sink having a plurality of LED mounting surfaces directed toward said lens and supporting a plurality of LEDs;
   wherein said louver includes a plurality of casting fasteners extending into said heat sink to maintain a predefined orientation between said heat sink and said louver.

8. The modular louver assembly of claim 7 wherein said fastener of said louver extends to integrally connect a second heat sink.

9. The modular louver assembly of claim 8, wherein said first and second heat sink cooling fins each have a plurality of gaps, said gaps receiving a matching plurality of said fasteners to align said first and second heat sink relative to one another.

10. The modular louver assembly of claim 9, wherein said plurality of LED's are connected to an LED driver mounted to an uppermost louver at said casting fastener.

11. A modular louver assembly for a bollard luminaire, comprising:
    a plurality of stacked light modules, each of said light modules having:
    a heat sink having a plurality of fins extending inwardly to a central aperture;
    a radially outward surface on said heat sink angled from a radially outward upper edge to a radially inward lower edge;
    a plurality of LEDs disposed on said radially outward surface;
    a louver disposed above said heat sink, at least a portion of said fins disposed within an opening of said louver;
    a lens disposed beneath said heat sink and said louver;
    wherein said plurality of stacked light modules are interchangeably interconnected in a pre-determined orientation and further wherein said plurality of stacked light modules form a central opening for a convection airflow current.

* * * * *